United States Patent [19]
Ide

[11] Patent Number: 6,097,897
[45] Date of Patent: Aug. 1, 2000

[54] CAMERA

[75] Inventor: Masataka Ide, Hachioji, Japan

[73] Assignee: Olympus Optical Co., Ltd., Tokyo, Japan

[21] Appl. No.: 09/238,260

[22] Filed: Jan. 27, 1999

[30] Foreign Application Priority Data

Jan. 30, 1998 [JP] Japan .................................. 10-018974

[51] Int. Cl.$^7$ .................................................. G03B 13/36
[52] U.S. Cl. ............................................. 396/93; 396/104
[58] Field of Search ................................ 396/91–93, 97, 396/104

[56] References Cited

U.S. PATENT DOCUMENTS

| | | | |
|---|---|---|---|
| 4,473,287 | 9/1984 | Fukuhara et al. | 396/93 |
| 4,511,232 | 4/1985 | Yamada et al. | 396/93 |
| 4,696,558 | 9/1987 | Karasaki et al. | 396/104 |
| 4,931,820 | 6/1990 | Matsuzawa et al. | 396/93 |

FOREIGN PATENT DOCUMENTS 9-218345  8/1997  Japan .

OTHER PUBLICATIONS

English language Abstract of Japanese KOKAI Publn. No. 9-218345.

*Primary Examiner*—W. B. Perkey
*Attorney, Agent, or Firm*—Frishauf, Holtz, Goodman, Langer & Chick, P.C.

[57] ABSTRACT

A camera of this invention includes a photographing optical system, an imaging means, an optical path splitting means, a lens shutter, a focus detecting means, and a correcting means. The imaging means senses an optical image, formed by a light beam passing through the photographing optical system, on a predetermined photographing plane. The optical path splitting means splits at least a portion of a light beam passing through the photographing optical system. The lens shutter opens and closes the optical path of the photographing optical system. The focus detecting means receives the split light beam and detects the defocus amount of an image formation plane of the light beam with respect to a predetermined primary image formation plane. The correcting means corrects any deviation between an image formation plane of the photographing light beam imaged by the imaging means and the primary image formation plane.

25 Claims, 10 Drawing Sheets

CAMERA

BACKGROUND OF THE INVENTION

The present invention relates to a camera including a lens shutter and, more particularly, to a camera system including a focus detecting device which splits a photographing light beam before a lens shutter disposed in a photographing optical system and performs focus detection for the split light beam.

Generally, a camera system incorporating a lens shutter includes a distance measuring optical system in addition to a photographing optical system and performs focus detection by using an external distance measuring method such as an "external passive method". However, such an external distance measuring method cannot provide any satisfactory distance measurement accuracy because parallax is produced between the photographing optical system and the distance measuring optical system.

To solve this problem, therefore, Jpn. Pat. Appln. KOKAI Publication No. 9-218345 has proposed a camera which removes parallax by performing focus detection by splitting a light beam in the middle of the optical path of a photographing optical system and before a lens shutter and guiding the split light beam to focus detecting means.

In the invention disclosed in Jpn. Pat. Appln. KOKAI Publication No. 9-218345, the difference between the F number (the aperture F number during exposure) of a photographing light beam reaching the film surface and the aperture F number of a focusing light beam reaching the focus detecting means or the like factor changes the relative positional relationship between the best image plane of an object image formed by the light beam guided to the photographing optical system and the best image plane of an object image formed by the focusing light beam guided onto a photoelectric conversion element via a portion of the photographing optical system.

Unfortunately, Jpn. Pat. Appln. KOKAI Publication No. 9-218345 does not mention any means for correcting this change in the relative positional relationship between the two best image planes. Accordingly, these two best image planes change relative to each other by focusing, zooming, and stopping operations of the photographing optical system and different wavelength components of the photographing light beam. This degrades the focus detection accuracy to result in an out-of-focus state.

BRIEF SUMMARY OF THE INVENTION

It is an object of the present invention to provide a camera having a lens shutter and including a focus detecting device capable of increasing the focus detection accuracy while removing parallax between a photographing optical system and a distance measuring optical system.

The present invention solves the above problems and achieves the object of the present invention by the following means.

That is, a camera according to the first invention comprises a photographing optical system, imaging means for sensing an optical image, formed by a light beam passing through the photographing optical system, on a predetermined photographing plane, a lens shutter for opening and closing an optical path of the photographing optical system, optical path splitting means positioned before the lens shutter to split at least a portion of a light beam passing through the photographing optical system, focus detecting means for receiving a light beam split by the optical path splitting means and detecting a defocus amount of an image formation plane of the light beam with respect to a predetermined primary image formation plane, and correcting means for correcting the defocus amount on the basis of deviation between an image formation plane of a photographing light beam imaged by the imaging means and the predetermined primary image formation plane.

A camera according to this first invention further comprises focusing optical system position detecting means for detecting a position of a focusing optical system in the photographing optical system, wherein the correcting means obtains the deviation between the image formation plane of the photographing light beam imaged by the imaging means and the predetermined primary image formation plane on the basis of an output from the focusing optical system position detecting means.

This camera further comprises wavelength detecting means for detecting a wavelength component of the photographing light beam, wherein the correcting means obtains the deviation between the image formation plane of the photographing light beam imaged by the imaging means and the predetermined primary image formation plane on the basis of an output from the wavelength detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5C show changes in the spherical aberration with respect to the object distance, in which

FIGS. 14A and 14B show the relationships between the zoom position and the lens extension position by a projected image position on an imaging plane, in which

DETAILED DESCRIPTION OF THE INVENTION

Embodiments of the present invention will be described below with reference to the accompanying drawings.

First Embodiment

Figure 1:
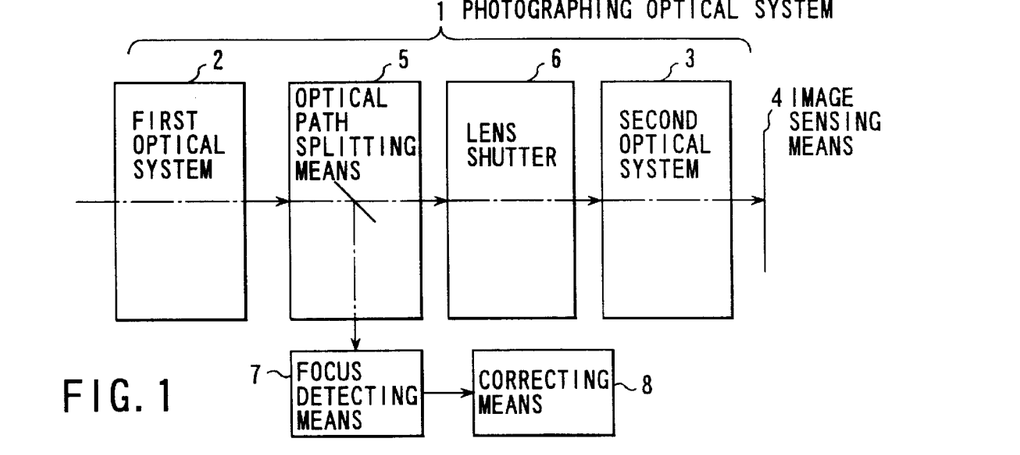
FIG. 1 is schematic block diagram showing a focus detecting device of a camera according to the present invention.

FIG. 1 schematically shows the arrangement of a camera according to the present invention. This camera includes a photographing optical system 1 and an imaging means 4 for sensing an optical image, formed by a light beam passing through the photographing optical system 1, on a predetermined photographing plane.

The photographing optical system 1 includes a lens shutter 6, an optical path splitting means 5, a focus detecting means 7, and a correcting means 8. The lens shutter 6 opens and closes the optical path of this photographing optical system 1. The optical path splitting means 5 splits at least a portion of a light beam passing through the photographing optical system 1. The focus detecting means 7 receives the light beam split by the optical path splitting means 5 and detects the defocus amount on the image formation plane of the light beam with respect to a predetermined primary image formation plane. The correcting means 8 corrects this defocus amount on the basis of the deviation between the image formation plane of the photographing light beam imaged by the imaging means 4 and the primary image formation plane.

A first optical system 2, the optical path splitting means 5, the lens shutter 6, and a second optical system 3 constructing this photographing optical system 1 are arranged in this order on the optical axis and form an object image on the imaging means 4. The focus detecting means 7 is so disposed as to be able to receive a portion of the light beam split by the optical path splitting means 5 inserted immediately before the lens shutter 6.

In the above arrangement, the optical path splitting means 5 optically splits a portion of the transmitted light beam before the lens shutter 6 toward the focus detecting means 7. The focus detecting means 7 optically receives the split light beam, detects the defocus amount of the image formation plane of the split light beam with respect to the predetermined primary image formation plane, supplies the result as an electrical signal to the subsequent correcting means 8. The correcting means 8 corrects the deviation between the best plane of image (to be referred to as the "best image plane" hereinafter) of the photographing light beam imaged by the imaging means 4 and the primary image formation plane, i.e., corrects the defocus amount described above, thereby performing focus detection of the photographing optical system 1.

Figure 2:
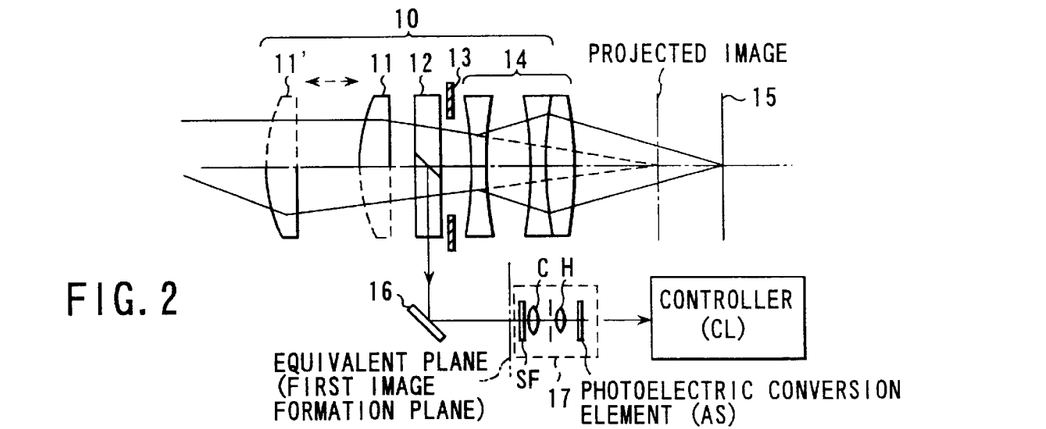
FIG. 2 is a view showing the arrangement of the focus detecting device according to the first embodiment of the present invention.

FIG. 2 shows a practical example of the above arrangement. The focus detecting device according to the first embodiment of the present invention is actually constructed as follows. That is, the first optical system 2 is, e.g., a "front-element focusing" lens group (to be also referred to as a focusing lens 11 hereinafter) which is extended for focusing. Along the optical axis of this focusing lens 11, a half prism 12 as the optical path splitting means 5, a lens shutter 13, and a second optical system lens group 14 as the second optical system are inserted in this order after the focusing lens 11. The focusing lens 11 as the first optical system is disposed in the front stage, and the position of the lens group 14 serving as the second optical system in the rear stage is fixed with respect to a film 15 as the imaging means 4.

A predetermined imaging plane is preset after the second optical system lens group 14, and the film 15 is placed on this imaging plane. On the other hand, a predetermined split optical path is formed along the reflection axis of the half prism 12. A mirror 16 and a focus detecting unit 17 including a lens optical system arranged along the reflection axis of the mirror 16 are disposed on the split optical path. An output from this focus detecting unit 17 is connected to a controller CL for performing focus detection calculations (to be described later) and the like.

The focus detecting unit 17 which functions as the focus detecting means 7 described earlier is a so-called "phase difference detection type" focus detecting unit. In this focus detecting unit 17, as shown in FIG. 2, an infrared cut filter SF, a condenser lens C, a pair of a separator lens H and a photoelectric conversion element As are uniaxially arranged. A primary image formation plane is obtained by inversely projecting the light-receiving plane (secondary image formation plane) of a photoelectric conversion element array on this photoelectric conversion element AS via the separator lens H and the condenser lens C.

Meanwhile, the position of a projected image of the imaging surface of the film 15 is determined by inversely projecting the imaging surface via the second optical system lens group 14. The position of an equivalent plane is determined by optically placing this projected image position on the split optical path.

The focus detecting unit 17 is so disposed that the primary image formation plane matches the equivalent plane.

The focus detecting device according to the present invention performs focusing by extending the focusing lens 11 and forms an image of the photographing light beam on the imaging surface of the film 15. In the aforementioned in-focus state, as shown in FIG. 2, a light beam transmitted through the focusing lens 11 forms an image in the position of the projected image on the imaging surface. Accordingly, a light beam obtained by splitting this transmitted light beam via the half prism 12 forms an image on the equivalent plane described above.

Since the equivalent plane matches the primary image formation plane, the defocus amount detected by the controller CL is 0. If, on the other hand, the photographing light beam forms an image before or after the film 15, the split light beam also forms an image before or after the equivalent plane. In accordance with the above principle, the focusing state of a whole photographing optical system 10 can be detected by using the controller CL on the basis of the detected defocus amount.

Figure 3:
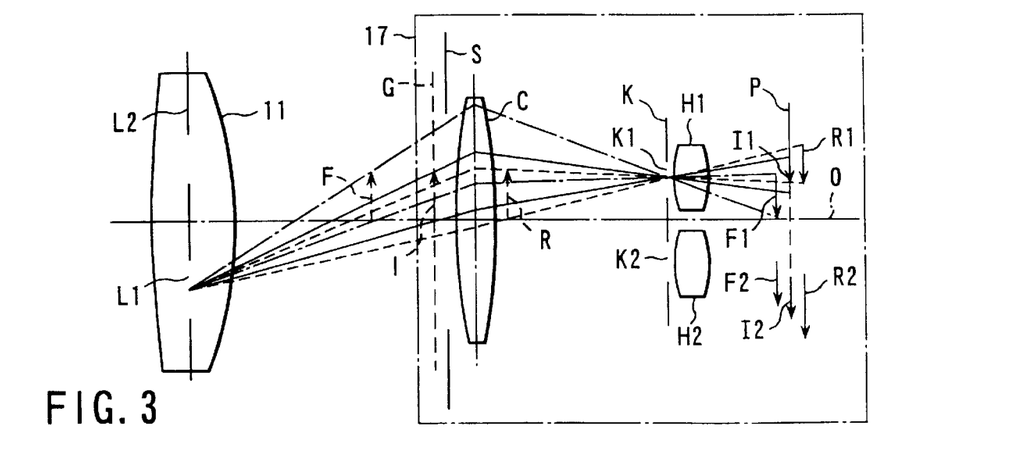
FIG. 3 is a view showing details of a focus detecting unit of the focus detecting device shown in FIG. 2.

FIG. 3 shows details of optical elements of the focus detecting unit 17 using the aforementioned phase difference detection method. As shown in FIG. 3, this focus detecting unit 17 includes a field mask S, a condenser lens C, a separator stop K having apertures K1 and K2 substantially symmetrical with respect to the optical axis of the split optical path, and separator lenses H1 and H2 inserted behind the apertures K1 and K2, respectively. Note that the infrared cut filter SF described above is omitted from FIG. 3.

A light beam coming from an object and entering through a region L1 of the focusing lens 11 constructing the photographing optical system is split by the half prism 12 (not shown) and reflected by the mirror 16 (not shown). After that, an image of the reflected light is formed on a photoelectric conversion element array P through the field mask S, the condenser lens C, the aperture K1 of the separator stop K, and the separator lens H1 in the focus detecting unit 17. Like this light beam transmitted through the region L1, an image of a light beam entering through a region L2 of the focusing lens 11 is formed on the photoelectric conversion element array p through the field mask S, the condenser lens C, the aperture K2 of the separator stop K, and the separator lens H2 in the focus detecting unit 17.

The photoelectric conversion element AS placed on this array P has first and second photoelectric conversion element arrays PDAL and PDAR corresponding to the separator lenses H1 and H2, respectively. When the photographing optical system is in-focus, i.e., when an object image I is formed on a primary image formation plane G, this object image I is again formed as first and second images I1 and I2 on a secondary image formation plane P (i.e., the photoelectric conversion element array) perpendicular to an optical axis O by the condenser lens C and the separator lenses H1 and H2.

If the photographing optical system 10 is in a so-called "front focus" state, i.e., if an object image F is formed before the primary image formation plane G, this object image F is again formed as first and second images F1 and F2 closer to and perpendicular to the optical axis O.

If the photographing optical system 10 is in a so-called "rear focus" state, i.e., if an object image R is formed behind the first image formation plane G, this object image R is again formed as first and second images R1 and R2 farther from and perpendicular to the optical axis O. By detecting the distance between these first and second images, the focusing state including the front or rear focus state of the photographing optical system 10 can be detected. More specifically, the light intensity distributions of the first and second images are obtained by the photoelectric conversion element to measure the distance between these images, and the distance is converted into a defocus amount.

Note that the positions of the object images F, I, and R correspond to the positions on the image formation planes of the light beam split by the optical path splitting means 5.

As described above, the focus detecting unit 17 performs focus detection by using only a light beam having a predetermined limited F number from the whole photographing light beam. This prevents so-called eclipse or shading of the focus detecting light beam caused by the exit pupil of the focusing lens 1. The F number corresponding to the numerical aperture of this focus detecting optical system is determined by the size, position, optical characteristics, and the like factor of each element of the focus detecting optical system.

Figure 4:
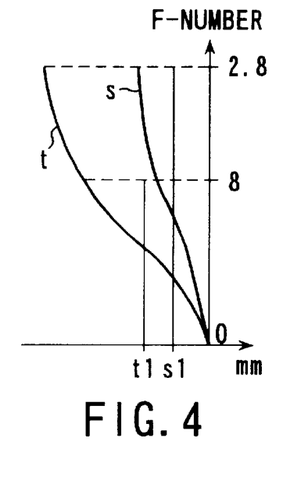
FIG. 4 is a graph showing the spherical aberrations of a whole photographing optical system and a first optical system.

FIG. 4 is a graph showing the spherical aberrations of the photographing optical system 10 and the focusing lens 11. The photographing optical system 10 as a whole and the focusing lens 11 have spherical aberrations as indicated by curves s and t shown in FIG. 4. Assume that the full-aperture F number of the photographing optical system 10 as a whole is F2.8 and the F number corresponding to the numerical aperture of the focus detecting optical system is F8. In the focus detecting optical system of the focus detecting unit 17, the position of the best image plane obtained by a light beam corresponding to F8 is t1 shown in FIG. 4, so focus detection is performed by using this position t1 as an in-focus position.

After an object is focused in this position t1 by a predetermined focusing operation, a predetermined exposure operation is performed. After that, the lens shutter 13 of the photographing optical system 10 opens to expose the film surface through an aperture corresponding to the F number of correct exposure. If a photograph is taken with the full-aperture F number (F2.8), the position of the best image plane of the photographing optical beam is s1. As a consequence, defocusing a (mm) represented by a=s1−t1 takes place. That is, defocusing corresponding to the aperture-step F number during photographing usually occurs.

Also, the aforementioned spherical aberrations s and t of the photographing optical system 10 as a whole and the focusing lens 11 change in accordance with the extension position of the focusing lens 11 as the first optical system, i.e., the "object distance".

Figure 5A:
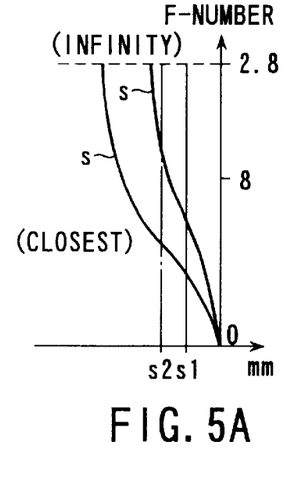
FIG. 5A is a graph showing the spherical aberration characteristics of a photographing light beam when an object is at infinity and the closest distance.
Figure 5B:
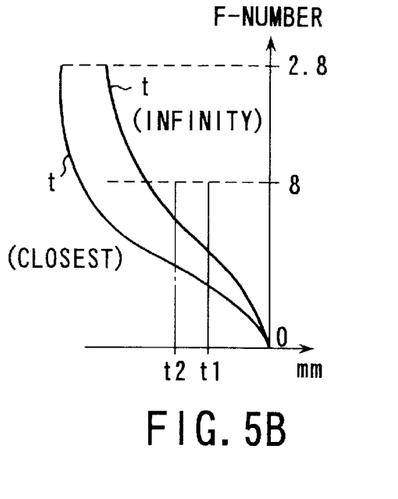
FIG. 5B is a graph showing the spherical aberration characteristics of the first optical system when an object is at infinity and the closest distance.

FIGS. 5A and 5B shows changes in the spherical aberrations with respect to this object distance. FIG. 5A shows the spherical aberration characteristics of a photographing light beam when an object is at infinity and the closest distance. As shown in FIG. 5A, the best image plane position at the closest distance differs by s2−s1 from that at infinity.

FIG. 5B shows the spherical aberration characteristics of the first optical system when an object is at infinity and the closest distance. As shown in FIG. 5B, the best image plane position at the closest distance differs by t2−t1 from that at infinity.

Accordingly, a difference a' between the best image plane of a photographing light beam and the best image plane of a focus detecting light beam when an object is at the closest distance is represented by $$a'=s2-t2$$
$$=(s2-s1-t2+t1)+(s1-t1)$$
$$=\{(s2-s1)-(t2-t1)\}+a \quad (1)$$

Figure 5C:
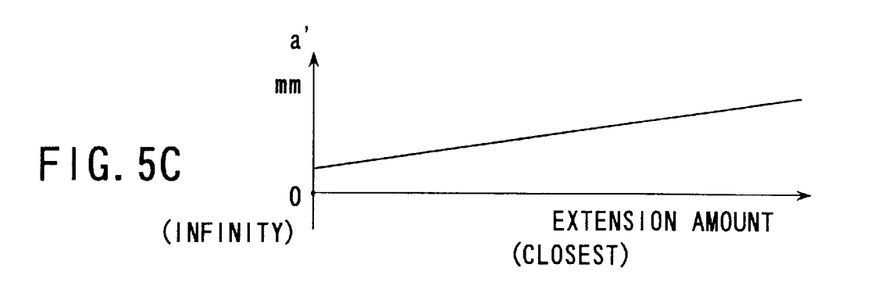
FIG. 5C is a graph showing a change in the extension amount of a focusing lens.

As described above, the deviation a' between the best image plane position of a light beam corresponding to F8, which is detected by the focus detecting optical system of the focusing detecting unit 17, and the best image plane position obtained by the photographing optical system changes in accordance with the extension amount of the focusing lens 11 as indicated by the curve shown in FIG. 5C.

Figure 6A:
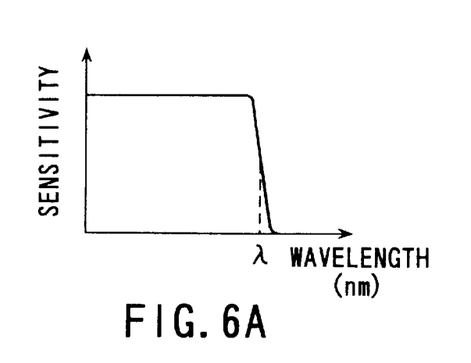
FIG. 6A is a graph showing the sensitivity of a photoelectric conversion element.
Figure 6B:
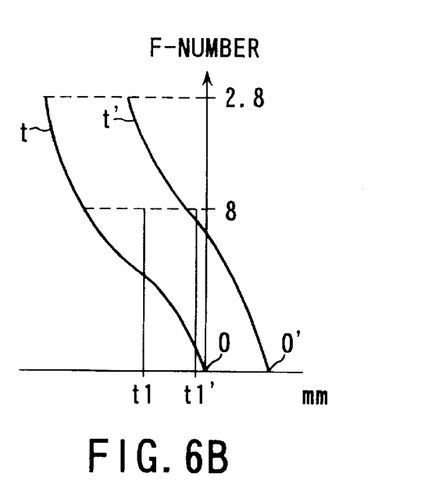
FIG. 6B is a graph showing the aberration curves of the first optical system with respect to visible light and light containing infrared light.

FIG. 6A shows the sensitivity of the photoelectric conversion element. FIG. 6B shows aberration curves t and t' of the focusing lens 11 with respect to visible light and light containing infrared light, respectively.

In the focus detecting unit 17, the infrared cut filter SF is disposed in the optical path to cut off infrared light harmful to focus detection. However, if infrared light is completely cut off, the amount of light reaching the photoelectric conversion element decreases. This makes focus detection at low luminance impossible. Therefore, the infrared cutoff wavelength is set to $\lambda=700$ to 750 nm, so the photoelectric conversion element has certain sensitivity to infrared light as shown in FIG. 6A. If this is the case, the focus detecting unit 17 detects an in-focus state when the best image plane of a light beam containing a large amount of infrared light compared to visible light comes to the focus detection plane. However, even when infrared light and visible light pass through the same optical system, their best image plane positions are different from each other due to chromatic aberration based on the difference between wavelengths. Accordingly, defocusing occurs under a light source containing a large amount of infrared light component.

FIG. 6B shows the aberration curves t and t' of the focusing lens 11 with respect to visible light and light containing infrared light, respectively. A difference of t1–t1' is produced between the best image plane position t1 of visible light and a best image plane position t1' of light containing infrared light at an F number (F8) corresponding to the numerical aperture of the focus detecting optical system. Assuming that the best image plane of a photographing optical system remains unchanged if infrared light is contained, defocusing corresponding to the difference (t1–t1') occurs with respect to the best image position s1 of visible light during film exposure in the photographing optical system.

In this first embodiment, an EEPROM as electrically rewritable storage means prestores, as correction amounts, a defocus amount an corresponding to the aperture F number (aperture F number during exposure) when a photograph is taken, a defocus amount $b_n$ corresponding to the extension position of the focusing lens 11, and a defocus amount $g_n$ corresponding to an infrared light component ratio. Defocus amounts corresponding to the aperture F number during photographing, the position of the focusing lens 11, and the infrared light component ratio are calculated and corrected. More specifically, the aperture F number is divided into a plurality of regions Fn, and defocus amounts $a_n$ corresponding to these regions Fn are stored. Analogously, the extension amount of the focusing lens 11 is divided into a plurality of regions Kn, and defocus amounts $b_n$ corresponding to these regions Kn are stored. Also, a plurality of defocus amounts $g_n$ corresponding to a ratio Hn of the infrared light component to the visible light component are stored.

After that, defocus amounts $a_n$ and $b_n$ corresponding to the aperture-step F number during correction and the extension position of the focusing lens 11, respectively, are selected. Also, the ratio of the infrared light component to the visible light component is detected, and a defocus amount corresponding to the detected ratio is selected. Finally, these defocus amounts $a_n$, $b_n$, and $g_n$ are used as correction values to calculate an accurate defocus amount with respect to the best image plane of a photographing light beam.

Figure 7:
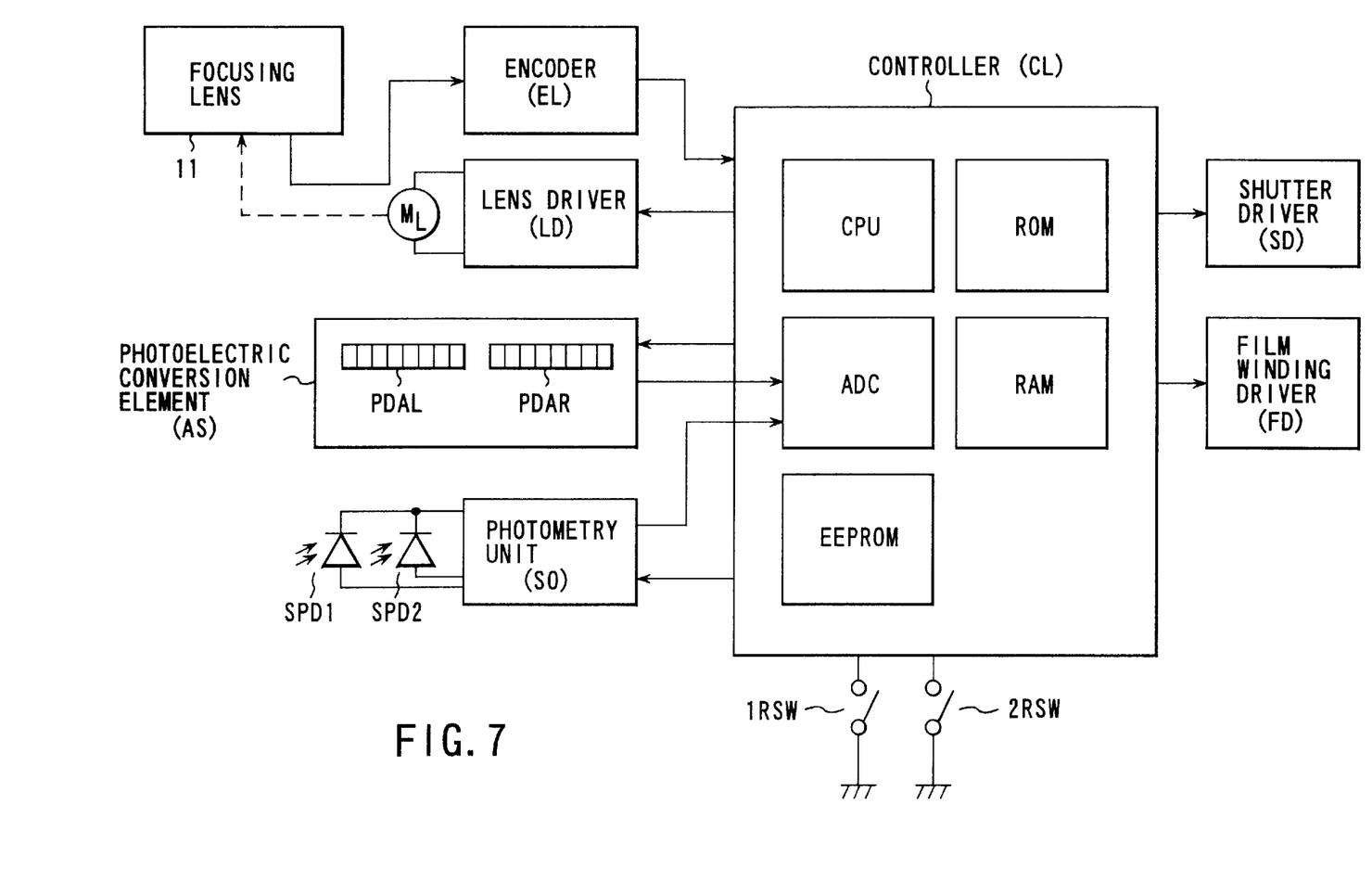
FIG. 7 is a block diagram showing the electrical control blocks of the camera according to the present invention.

FIG. 7 is a block diagram showing the arrangement of the camera system according to the present invention. Blocks of particularly electrical control will be described below with reference to FIG. 7. As in FIG. 7, this camera system is controlled by the controller CL incorporating a CPU (Central Processing Unit), ROM, RAM, and A/D converter ADC for analog-to-digital conversion. The ROM of this controller CL stores a predetermined sequence program of the camera, and a series of operations of the camera are controlled in accordance with the program.

The controller CL also includes an EEPROM capable of storing correction data pertaining to AF control, photometry, and the like for each camera body.

As shown in FIG. 7, the controller CL is connected to an encoder EL, a lens driver LD, the photoelectric conversion element AS, a photometry unit SO, a shutter driver SD, a film wind driver FD, and release switches (1RSW and 2RSW).

The lens driver LD drives the focusing lens 11 as the first optical system of the photographing optical system 10 by a motor ML under the control of the controller CL.

The encoder EL generates pulses corresponding to the moving amount of the focusing lens 11. The controller CL detects these pulses and appropriately controls the lens driving.

The photometry unit SO has a photodiode SPD1 for measuring the visible light component and a photodiode SPD2 for measuring the infrared light component. These photodiodes SPD1 and SPD2 generate outputs corresponding to the luminances of visible light and infrared light components, respectively, of an object. The controller CL causes the A/D converter ADC to perform A/D conversion for these photometric outputs and stores visible light and infrared light photometric values in the RAM.

The shutter driver SD drives the lens shutter 13 under the control of the controller CL.

The film wind driver FD winds a film in accordance with a command from the controller CL.

The switch 1RSW (first release switch) and the switch 2RSW (second release switch) are interlocked with the release button; the switch 1RSW is turned on by the first stroke of the release button, and the switch 2RSW is turned on by the second stroke of the release button.

The controller CL performs "photometry" and "AF" when the switch 1RSW is turned on and exposes and winds a film immediately after the exposure when the switch 2RSW is turned on.

The process procedure of the camera system according to the gist of the present invention will be described below with reference to a flow chart shown in FIG. 8. This flow chart shows a main routine of the operation control procedure of the controller CL shown in FIG. 7.

When the controller CL starts operating, this main routine is executed. First, the controller CL reads out various correction data prestored in the EEPROM and develops the readout data on the RAM (S100).

In step S101, the controller CL checks whether the switch 1RSW is turned on. If NO in step S101, the flow advances to step S109. If YES in step S100, the controller CL activates the photometry unit SO to perform photometry for measuring the object luminance based on visible light and calculates the aperture-step F number and the shutter speed by which correct exposure is performed. Simultaneously, the controller CL calculates the ratio of the infrared light component to the visible light component from the photometric values of these components (S102).

After that, the controller CL performs an autofocusing (AF) process. That is, the controller CL detects the focusing state of an object, drives the focusing lens 11 to an in-focus position to focus on the object, and calls and executes a sub-routine "AF" to be described later (S103).

The controller CL then checks whether an in-focus state is obtained as a result of the above "AF" or autofocusing operation (S104). If NO in step S104, the flow advances to step S108. If YES in step S104, the controller CL checks whether the switch 2RSW is turned on (S105).

If NO in step S105, the flow returns to step S101. If YES in step S105, the controller CL controls the lens shutter 13 in the photographing optical system to perform exposure in accordance with the aperture value and shutter speed determined on the basis of the photometric values obtained in step S102 (S106).

After this exposure, the controller CL closes the lens shutter 13 and winds the photographed film to feed the film to the next frame position (S107), thereby completing a series of photographing operations.

In step S108, the controller CL controls predetermined indication on indicators LCD and LED (not shown).

In step S109, assuming that switches other than the switches 1RSW and 2RSW interlocked with the shutter may have been operated, the controller CL checks the states of the other switches (S109). If no other switch is turned on in step S109, the flow advances to step S108. If another switch is turned on in step S109, the controller CL executes processing corresponding to the ON switch (S110), and then the flow advances to step S108.

Figure 8:
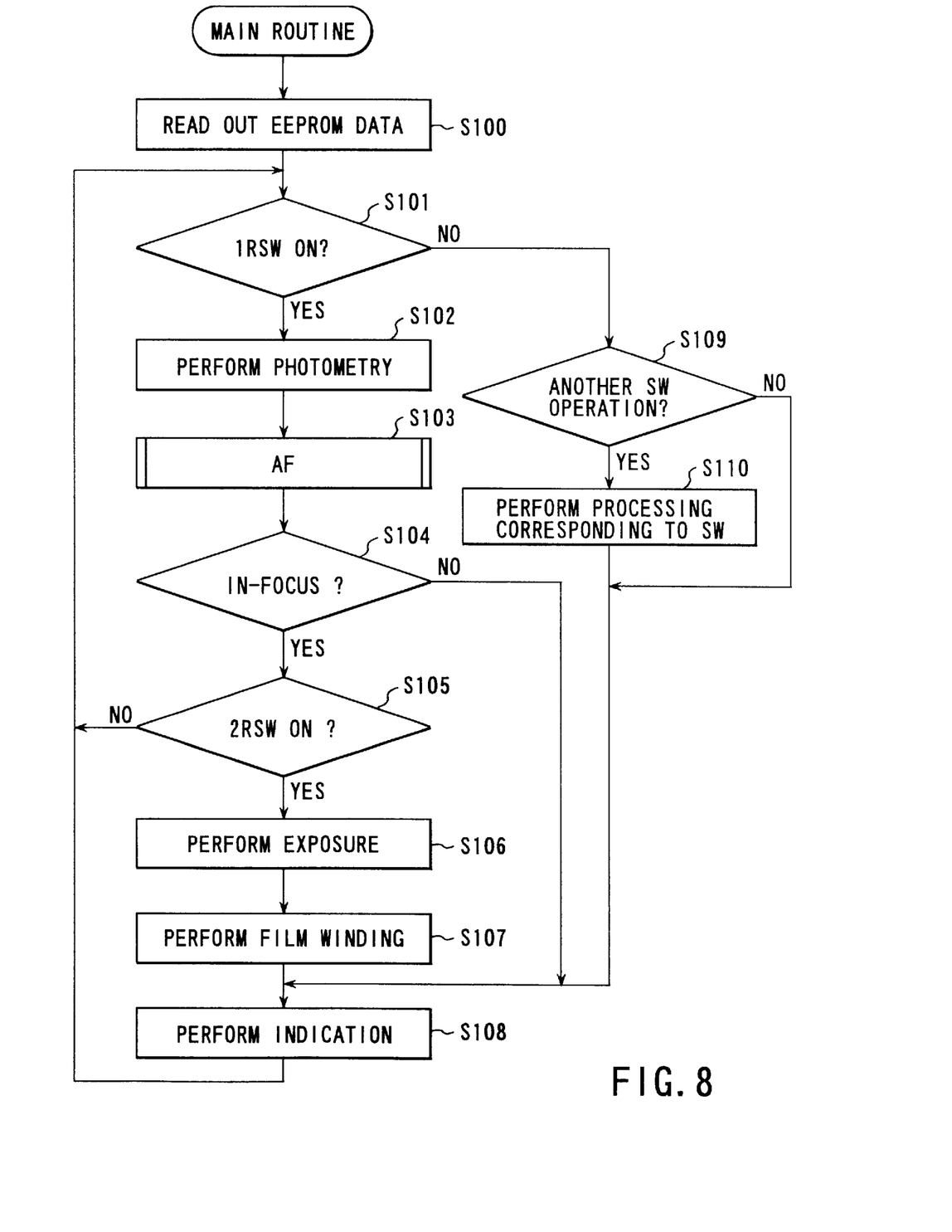
FIG. 8 is a flow chart of a "main routine" showing the operation of the camera of the present invention.
Figure 9:
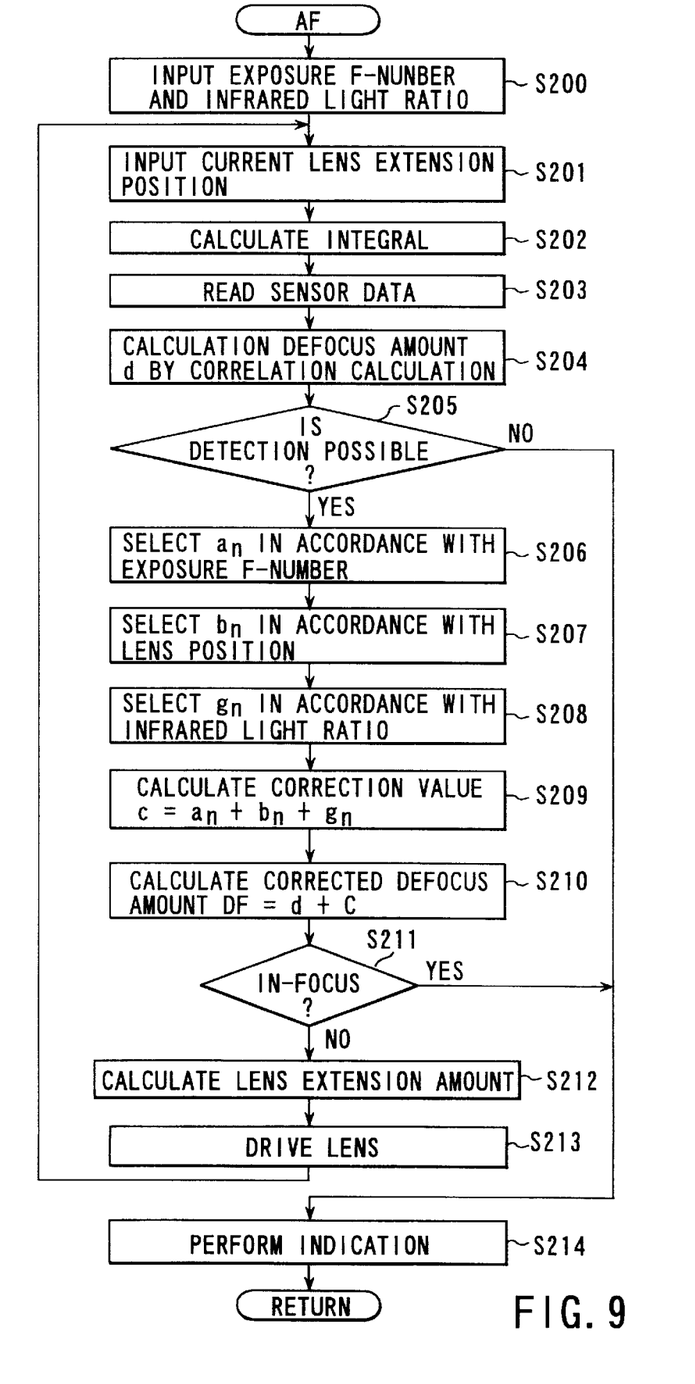
FIG. 9 is a flow chart showing a sub-routine "AF" according to the first embodiment.

FIG. 9 is a flow chart showing the procedure of the sub-routine "AF" of the main routine shown in FIG. 8 of this first embodiment.

At the start of this sub-routine, the controller CL inputs the previously calculated F number during exposure and ratio of the infrared light component to the visible light component (S200).

In step S201, the controller CL inputs the current focusing lens extension position.

The controller CL then stores electric charge in the photoelectric conversion element array (S202) and reads out sensor data indicating the stored charge amount of the photoelectric conversion element array (S203).

Next, the controller CL performs a focus detection calculation on the basis of the sensor data (S204). In this focus detection calculation, the controller CL calculates the distance between two images formed on the photoelectric conversion element arrays PDAL and PDAR by a correlation calculation, thereby calculating a defocus amount d between the image formation plane (equivalent plane) of the split light beam and the predetermined primary image formation plane.

In step S205, the controller CL checks the reliability of the focus detection. If the focus detection is not reliable, the controller CL determines that detection is impossible, and the flow advances to step S214. The controller CL indicates "detection is impossible" by, e.g., turning on and off an in-finder LED (S214). After that, the flow returns to the main routine.

If detection is possible, the controller CL selects an EEPROM correction value an prestored in the RAM and corresponding to the aperture-step F number during exposure of the photographic optical system 10, which is calculated in step S102 (S206).

The controller CL then selects a correction value $b_n$ corresponding to the extension position of the focusing lens 11 from the encoder EL (S207).

Also, the controller CL selects a correction value $g_n$ corresponding to the ratio of the infrared light component to the visible light component (S208).

On the basis of the values $a_n$, $b_n$, and $g_n$ thus selected, the controller CL calculates a defocus correction amount c by (S209):

$$a_n + b_n + g_n = c \qquad (2)$$

Subsequently, the controller CL corrects defocusing by adding this defocus correction amount c to the defocus amount d and calculates a corrected defocus amount DF as the deviation between the current image plane and best image plane of the photographing light beam by (S210):

$$DF = d + c \qquad (3)$$

The controller CL checks whether the corrected defocus amount DF is in an allowable range (S211). If YES in step S211, the flow advances to step S214, and the controller CL indicates "in-focus state" (S214). After that, the flow returns to the main routine. Note that this in-focus state indication informs the user of an in-focus state by turning on and off the in-finder LED (not shown) for indicating an in-focus state or by causing a PCV (not shown) to generate sound.

On the other hand, if the controller CL detects an "out-of-focus state" in step S211, the controller CL calculates the extension amount of the focusing lens 11 by which an in-focus state is obtained on the basis of the corrected defocus amount DF calculated in step S210 (S212).

On the basis of this lens extension amount, the lens driver LD drives the focusing lens 11 to perform focusing (S213). After that, the flow returns to step S210, and the controller CL stores electric charge in the photoelectric conversion element array.

The controller CL performs the series of focus detecting operations and drives the focusing lens as described above and repeats these operations until the object is focused.

Modification 1

In the above first embodiment, the photodiode SPD2 is used to detect the infrared light component. However, it is also possible to use another light-receiving element, such as a remote-control light-receiving element, which detects only the infrared light component.

Second Embodiment

The second embodiment according to the camera of the present invention will be described below.

Figure 10:
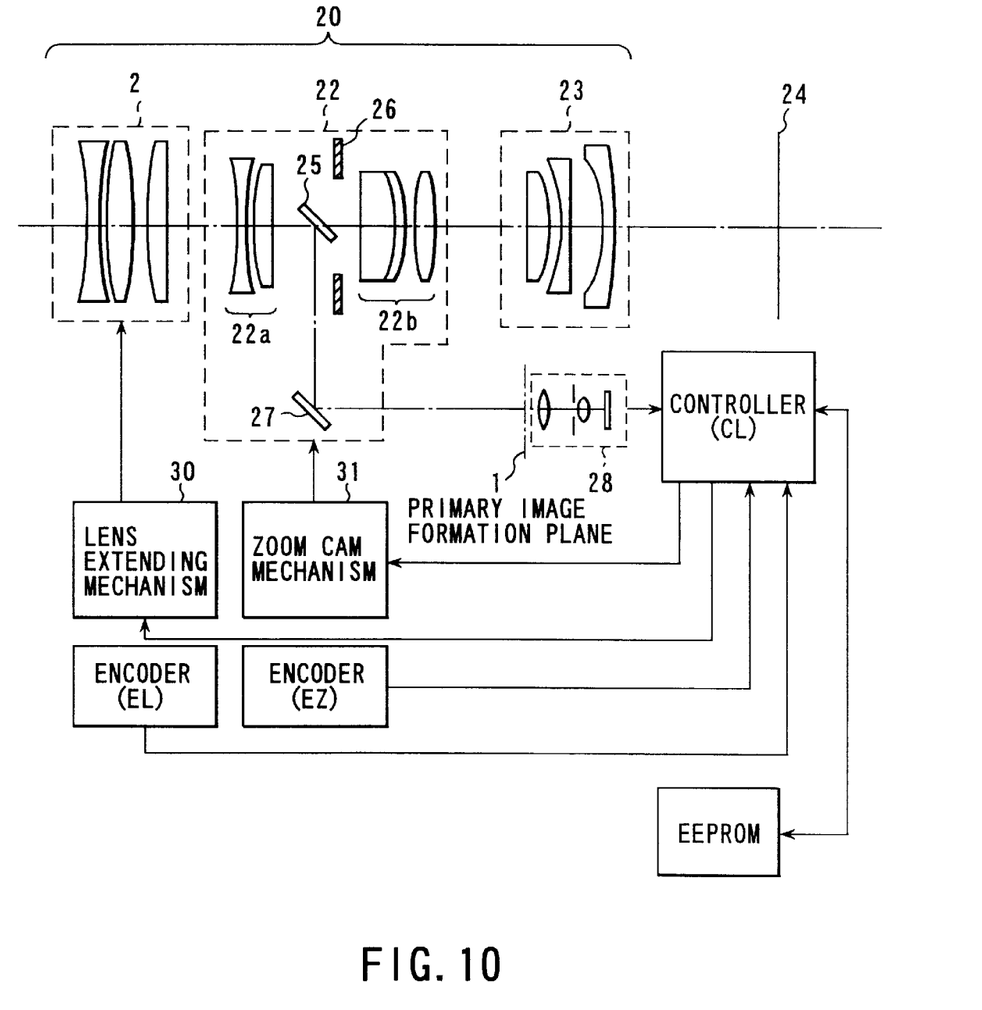
FIG. 10 is a view showing the arrangement of a focus detecting device according to the second embodiment of the present invention.

FIG. 10 shows a zoom lens according to the second embodiment. As shown in FIG. 10, a photographing optical system 20 is composed of three sections, i.e., a focusing lens group 21, a magnification block 22, and a rear lens group 23. A film surface 24 on an imaging plane is positioned after this photographing optical system 20. The magnification block 22 includes front and middle lens groups 22a and 22b between which a total reflection mirror 25 and a lens shutter 26 are inserted.

A predetermined split optical path is formed in the reflection direction of this total reflection mirror 25. A mirror 27 and a focus detecting unit 28 are arranged on this split optical path. An output from this focus detecting unit 28 is supplied to a controller CL to perform focus detection calculations. The mirror 27 moves integrally with the magnification block 22 when zooming is performed.

The controller CL is connected to a lens extending mechanism 30 for performing focusing and a zoom cam mechanism 31 for varying the focal length and thereby controls the extending operation and zoom position of the focusing lens group 21. An encoder EL of the lens extending mechanism 30 supplies lens extension amount information to the controller CL. Also, an output from an encoder EZ of the zoom cam mechanism 31 is supplied to the controller CL.

In this arrangement, the zoom cam mechanism 31 moves the magnification block 22 by zoom driving. Consequently, a difference is produced due to, e.g., an aberration difference between a photographing light beam reaching the imaging plane through the focusing lens group 21, the magnification block 22, and the rear lens group 23 and a focus detecting light beam split by the total reflection mirror 25 after passing through the front lens group 22a of the magnification lens 22. This difference changes the deviation between the best image plane of the photographing light beam and the best image plane of the focus detecting light beam, and this change appears as defocusing.

The principal characteristic feature of this second embodiment is that an accurate defocus amount is detected by correcting variations in the deviation between the best image plane of the photographing light beam and the best image plane of the focus detecting light beam when zooming is performed.

An entire variation range of the encoder EZ of the zoom cam mechanism 31 is divided into a plurality of regions, and correction values $z_n$ corresponding to these regions are set and stored in an EEPROM. This EEPROM also stores correction values $a_n$, $b_n$, and $g_n$ relating to the focusing lens extension position, F number during exposure, and infrared light ratio, as in the first embodiment described above.

Figure 11:
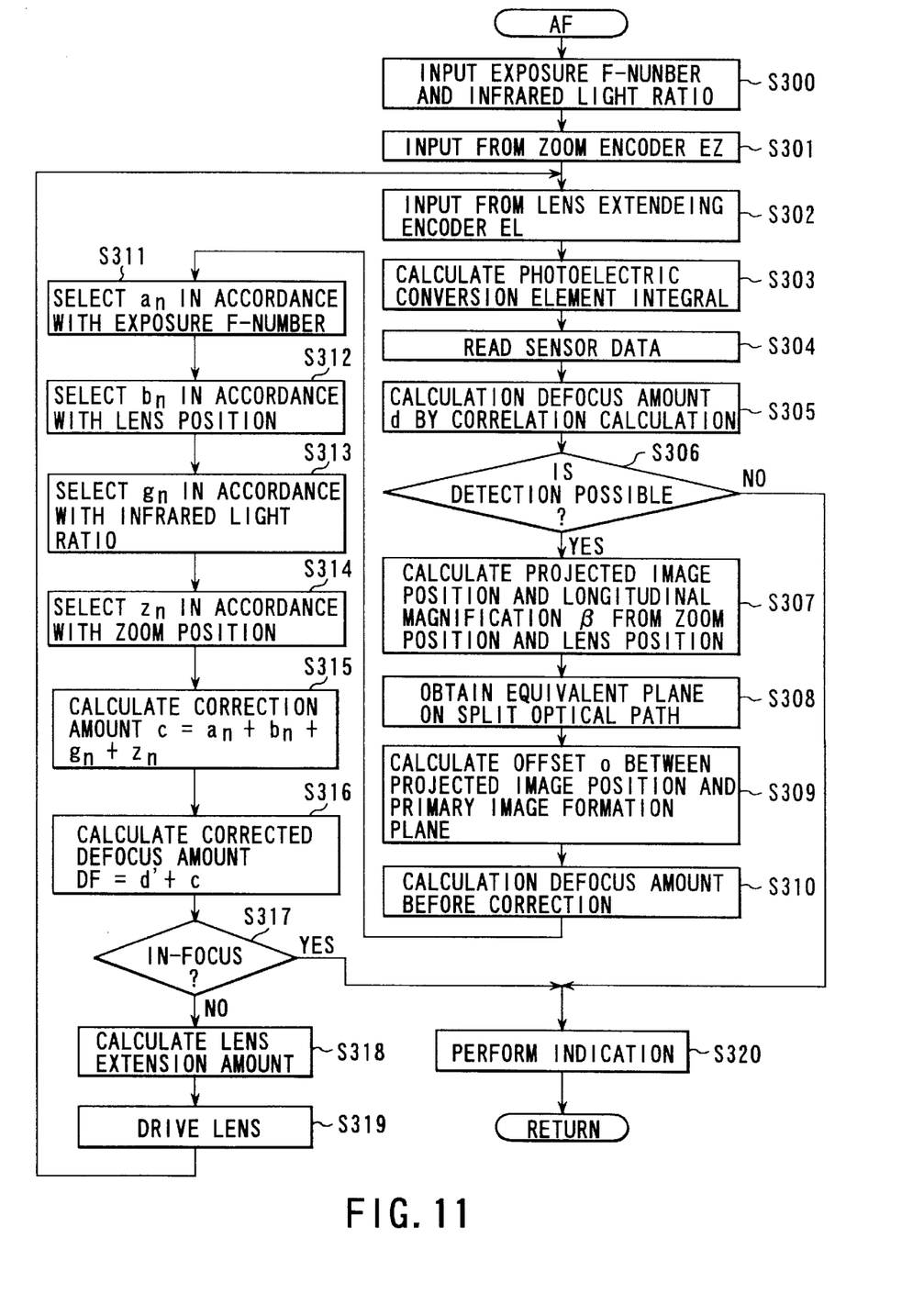
FIG. 11 is a flow chart showing a sub-routine "AF" according to the second embodiment of the present invention.

FIG. 11 shows a sub-routine "AF" for this second embodiment. Since "AF" in FIG. 9 is based on the photographing optical system 10, only portions changed in this embodiment will be described below. Assume that as in the first embodiment, the "main routine" shown in FIG. 8 is executed prior to this sub-routine "AF" and data necessary for correction stored in the EEPROM are mapped on a RAM of the controller CL.

First, the controller CL inputs the F number during exposure and the infrared light ratio already calculated in the main routine (S300).

The controller CL reads out the output from the encoder EZ of the zoom cam mechanism 31 (S301) to obtain the current zoom position information.

In step S302, the controller CL inputs the lens extension amount from the encoder EL of the lens extending mechanism 30.

Steps S303 to S306 are identical with those in the flow chart "AF" shown in FIG. 9, so a detailed description thereof will be omitted.

In subsequent step S307, on the basis of the zoom position and lens extension position, the controller CL obtains the positions of the focusing lens group 21, the magnification block 22, and the rear lens group 23 and calculates the projected image position on the imaging plane of the middle lens group 22b of the magnification block 22 and the rear lens group 23 and a longitudinal magnification β.

Figure 14A:
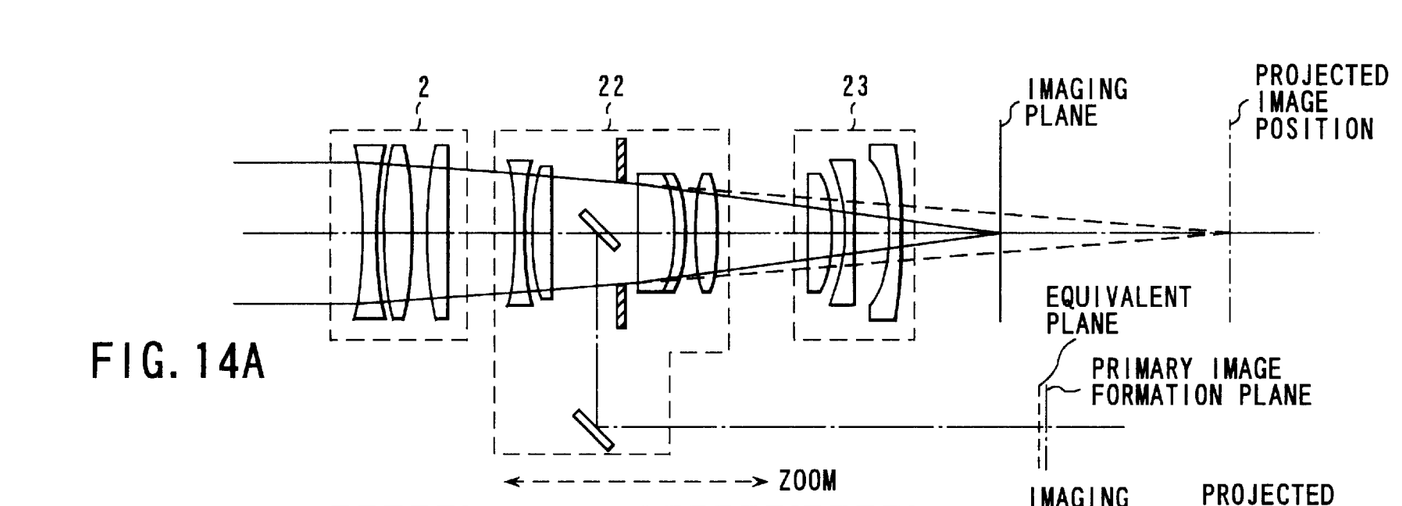
FIG. 14A is a view for explaining that an equivalent plane of a projected image matches a primary image formation plane.
Figure 14B:
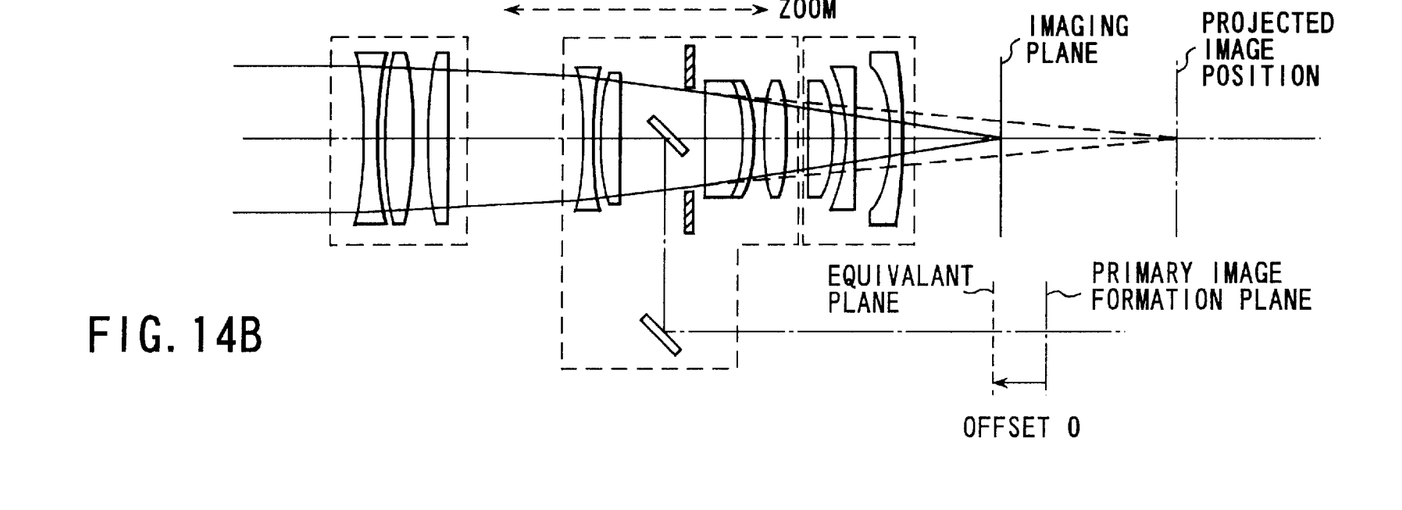
FIG. 14B is a view for explaining that these planes are offset by zoom driving.

As shown in FIGS. 14A and 14B, the projected image position on the imaging plane changes in accordance with the zoom position and the lens extension position. Accordingly, although the equivalent plane of the projected image matches the primary image formation plane in FIG. 14A, offset o takes place due to zooming as shown in FIG. 14B. Additionally, the longitudinal magnification β of the middle lens group 22b of the magnification block 22 and the rear lens group 23 on the photographing light beam side must be taken into consideration because this magnification also changes by zooming.

Next, the controller CL obtains an equivalent plane on the split optical path equivalent to the projected image position on the imaging plane (S308).

Furthermore, the controller CL calculates the offset o between the equivalent plane and the primary image formation plane (S309) and calculates a defocus amount d' before correction in accordance with equation (4) below by which the offset o is subtracted from the defocus amount d and the difference is multiplied by the longitudinal magnification β (S310):

$$d'=(d-O)\cdot\beta \tag{4}$$

Subsequent steps S311 to S313 are identical with steps S206 to S208 in "AF" shown in FIG. 9, so a detailed description thereof will be omitted. The flow then advances to step S314, and the controller CL selects a correction value $z_n$ in accordance with the zoom encoder value (S314). The controller CL calculates a total correction amount c using (S315):

$$c=a_n+b_n+g_n+z_n \tag{5}$$

Next, the controller CL calculates a corrected defocus amount DF corrected on the basis of (S316):

$$DF=d'+c \tag{6}$$

Subsequent steps S317 to S320 are identical with step S211 and the subsequent steps in "AF" shown in FIG. 9, so a detailed description thereof will be omitted.

Effect 2

In this second embodiment as described above, an accurate defocus amount can be obtained by correction performed by selecting a correction value corresponding to the zoom position. Also, variations in the longitudinal magnification β and the projected image position on the imaging plane resulting from variations in the manufacture of the photographing optical system and variations in each optical component can be simultaneously corrected by adjusting the correction values in accordance with the zoom and lens positions for each camera body and writing adjusted values in the EEPROM.

If the light beam passing through the focusing lens group 21 and the front lens group 22a of the magnification block 22 diverges, a correcting optical system which moves integrally with the magnification block 22 must be placed behind the mirror 27 on the split optical path. If this is the case, the defocus amount d is converted into the corrected defocus amount DF by taking account of the longitudinal magnification of this correcting optical system.

Modification 2

If the correction values pertaining to the focusing lens extension position, aperture F number during exposure, and infrared light ratio change in accordance with the zoom position, it is only necessary to store these correction values in relation to the zoom positions and perform correction by using the stored correction values.

Third Embodiment

Figure 12:
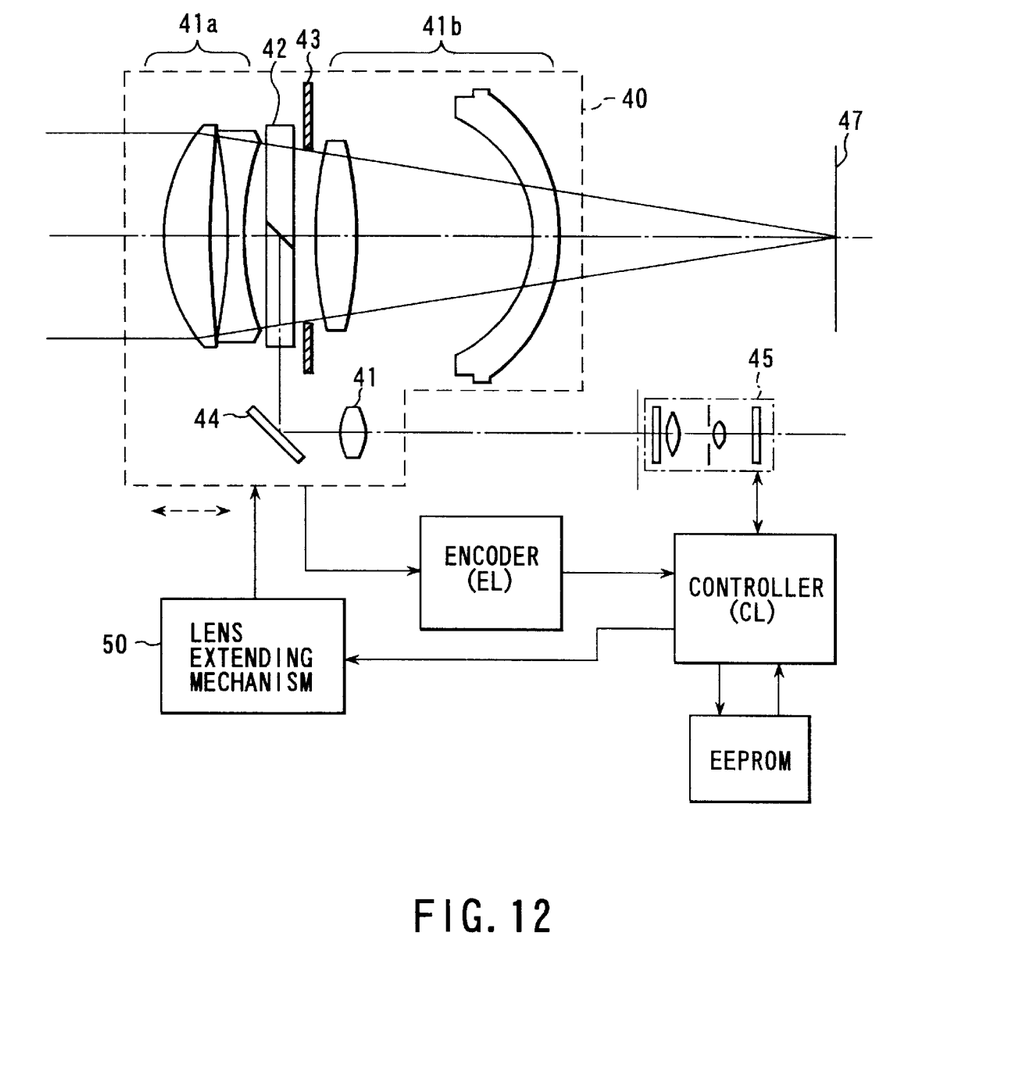
FIG. 12 is a view showing the arrangement of a focus detecting device according to the third embodiment of the present invention.

FIG. 12 shows the third embodiment of the camera according to the present invention. In this embodiment, a photographing optical system 40 includes first and second optical systems 41a and 41b in front and rear to form a so-called "total extension type" focusing system. An imaging plane is preset behind the second optical system 41b, and a film 47 is placed on this imaging plane.

A half prism 42 and a lens shutter 43 are inserted in this order between the optical systems 41a and 41b, and a split optical path is formed in the reflection direction of the half prism 42. Along this split optical system, a mirror 44, an equivalent optical system 41c, and a focus detecting unit 45 are arranged in this order. An output from the focus detecting unit 45 is connected to a controller CL.

The controller CL is connected to a lens extending mechanism 50 for performing focusing and thereby controls focusing. An encoder EL of the lens extending mechanism 50 supplies lens extension amount information to the controller CL.

The equivalent optical system 41c has a principal point position and focal length equivalent to those of the second optical system 41b and moves integrally with it.

In a camera system with the above arrangement, the equivalent optical system 41c and the second optical system 41b construct equivalent optical systems, so an image space equivalent to that on the film 47 is formed on the split optical system. Also, the equivalent optical system 41c moves integrally with the second optical system 41b when focusing is performed. Therefore, the corrected defocus amount DF on the imaging plane can be directly calculated on the basis of the defocus amount detected by the controller CL.

Although the equivalent optical system 41c and the second optical system 41b are equivalent optical systems, the use of exactly identical optical systems is unpreferable because the degrees of freedom of arrangement and dimensions are limited.

That is, the equivalent optical system 41c and the second optical system 41b have different optical characteristics except for the principal point position and focal length and have different aberration characteristics. This changes the relationship between the best image plane of a photographing light beam and the best image plane of a focus detecting light beam, resulting in defocusing.

In this third embodiment, therefore, correction amounts pertaining to the aperture F number, focusing lens extension position, and ratio of the infrared light component to the visible light component are approximated to linear expressions in terms of these parameters, and the resultant coefficients are stored in the EEPROM. When a picture is taken, the aperture F number, focusing lens extension amount, and ratio of the infrared light component to the visible light component are detected, and the corresponding correction amounts are calculated in accordance with the stored coefficients by using the linear expressions. In this manner the detected defocus amount is corrected.

Figure 13:
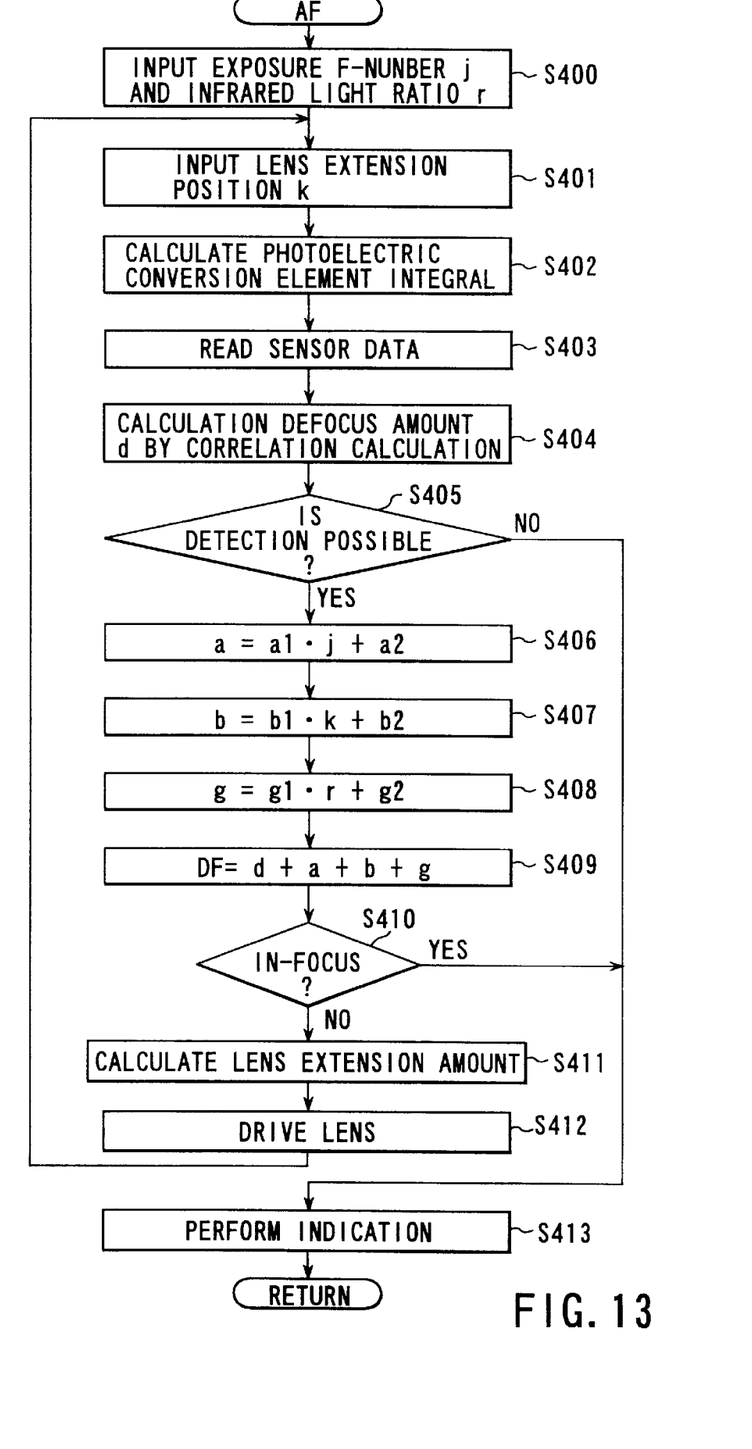
FIG. 13 is a flow chart showing a sub-routine "AF" according to the third embodiment.

FIG. 13 shows a sub-routine "AF" representing the process procedure of the camera system according to the third embodiment of the present invention. Since FIG. 13 is based on "AF" shown in FIG. 9, only changed portions will be described below.

Before the sub-routine "AF" shown in FIG. 13 is executed, the "main routine" shown in FIG. 8 is already executed as in the first embodiment, and coefficients $a_1$, $a_2$, $b_1$, $b_2$, $g_1$, and $g_2$ (to be described later) stored in the EEPROM are mapped on a RAM of the controller CL.

First, the controller CL inputs an already calculated F number j during exposure and infrared light ratio r (S400). The controller CL also inputs a lens extension amount k from the encoder EL of the lens extending mechanism 50 (S401).

Steps S402 to S405 are identical with steps S202 to S205 in the flow chart "AF" shown in FIG. 9, so a detailed description thereof will be omitted.

The flow advances to step S406, and the controller CL calculates a correction amount a using the coefficients $a_1$ and $a_2$ read out from the EEPROM by (S406):

$$a = a_1 \cdot j + a_2 \qquad (7)$$

Next, in accordance with the lens extension amount k, the controller CL calculates a correction amount b using the coefficients $b_1$ and $b_2$ read out from the EEPROM by (S407):

$$b = b_1 \cdot k + b_2 \qquad (8)$$

Subsequently, in accordance with the infrared light ratio r, the controller CL calculates a correction amount g using the coefficients $g_1$ and $g_2$ read out from the EEPROM by (S408):

$$g = g_1 \cdot r + g_2 \qquad (9)$$

Finally, the controller CL calculates the corrected defocus amount DF by (S409):

$$DF = d + a + b + g \qquad (10)$$

Subsequent steps S410 to S413 are identical with step S211 and the subsequent steps in the flow chart shown in FIG. 9, so a detailed description thereof will be omitted.

Effect 3

In the third embodiment as described above, correction amounts corresponding to the aperture F number, focusing lens extension amount, and ratio of the infrared light component to the visible light component are calculated by linear approximation. Consequently, an accurate corrected defocus amount DF can be obtained by correcting the detected defocus amount d by using these calculated correction amounts.

In this embodiment, correction amounts are calculated by linear approximation. However, the same effect can be obtained by using quadratic approximation or approximation of higher order.

Other Modifications

Other modifications can be practiced without departing from the gist of the present invention.

Effects of the Present Invention

As described above, according to, e.g., a lens shutter camera to which the gist of the present invention is applied, it is possible to provide a camera including a focus detecting device capable of achieving a startling effect by increasing the focus detection accuracy while removing parallax between the photographing optical system and the distance measuring optical system by correcting the difference between the best image plane on the film surface and the best image plane obtained by focus detection by a light beam limited by an aperture.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a photographing optical system;

imaging means for sensing an optical image, formed by a light beam passing through said photographing optical system, on a predetermined photographing plane;

a lens shutter for opening and closing an optical path of said photographing optical system;

optical path splitting means positioned before said lens shutter to split at least a portion of a light beam passing through said photographing optical system;

focus detecting means for receiving a light beam split by said optical path splitting means and detecting a defocus amount of an image formation plane of the light beam with respect to a predetermined primary image formation plane; and correcting means for correcting the defocus amount on the basis of deviation between an image formation plane of the photographing light beam imaged by said imaging means and the predetermined primary image formation plane;

wherein said deviation is caused by an aberration of said photographing optical system.

2. A camera according to claim 1, further comprising focusing optical system position detecting means for detecting a position of a focusing optical system in said photographing optical system, wherein said correcting means obtains the deviation between the image formation plane of the photographing light beam imaged by said imaging means and the predetermined primary image formation plane on the basis of an output from said focusing optical system position detecting means.

3. A camera according to claim 1, further comprising wavelength detecting means for detecting a wavelength component of the photographing light beam, wherein said correcting means obtains the deviation between the image formation plane of the photographing light beam imaged by said imaging means and the predetermined primary image formation plane on the basis of an output from said wavelength detecting means.

4. A camera comprising:

a photographing optical system including first and second optical systems in front and rear;

imaging means for sensing an optical image, formed by a light beam passing through said photographing optical system, on a predetermined imaging plane;

optical path splitting means positioned between said first and second optical systems to split at least a portion of a light beam passing through said photographing optical system;

a lens shutter positioned behind said optical path splitting means to open and close an optical path of said photographing optical system;

focus detecting means for receiving a light beam split by said optical path splitting means and detecting a defocus amount between a predetermined primary image formation plane and an image formation plane of the light beam; and correcting means for correcting the defocus amount detected by said focus detecting means on the basis of deviation between an image formation plane of the photographing light imaging by said imaging means and the predetermined primary image formation plane, said deviation being caused by a difference between aberrations of said first and second optical systems and an aberration of said first optical system.

5. A camera according to claim 4, further comprising:

photometry means for measuring object luminance; and calculating means for calculating an aperture F number during photographing on the basis of an output from said photometry means, wherein said correcting means corrects the defocus amount on the basis of an output from said calculating means.

6. A camera according to claim 5, further comprising storage means for storing data concerning the defocus amount correction corresponding to the aperture F number during photographing, wherein said correcting means corrects the defocus amount on the basis of the data stored in said storage means.

7. A camera according to claim 4, further comprising position detecting means for detecting an extension amount of said first optical system, wherein said correcting means corrects the defocus amount on the basis of an output from said position detecting means.

8. A camera according to claim 7, further comprising storage means for storing data concerning the defocus amount correction corresponding to the extension amount of said first optical system, wherein said correcting means corrects the defocus amount on the basis of the data stored in said storage means.

9. A camera according to claim 4, further comprising:

photometry means for measuring luminances of a visible light component and infrared light component of an object; and calculating means for calculating a ratio of the infrared light component to the visible light component of the object on the basis of an output from said photometry means, wherein said correcting means corrects the defocus amount on the basis of an output from said calculating means.

10. A camera according to claim 9, further comprising storage means for storing data concerning the defocus amount correction corresponding to the luminance ratio of the infrared light component to the visible light component of the object, wherein said correcting means corrects the defocus amount on the basis of the data stored in said storage means.

11. A camera according to claim 4, wherein said photographing optical system further comprises a variable-focal-length zoom mechanism and position detecting means for detecting zoom position information of said zoom mechanism, and said correcting means corrects the defocus amount on the basis of an output from said position detecting means.

12. A camera according to claim 11, further comprising storage means for storing data concerning the defocus amount correction corresponding to the zoom position information, wherein said correcting means corrects the defocus amount on the basis of the data stored in said storage means.

13. A camera comprising:

a photographing optical system;

a film for sensing an optical image, formed by a light beam passing through said photographing optical system, on a predetermined photographing plane;

a half prism for splitting at least a portion of a light beam passing through said photographing optical system;

a focus detecting unit for receiving a light beam split by said half prism and detecting a defocus amount of an image formation plane of the light beam with respect to a predetermined primary image formation plane; and a controller for correcting the defocus amount detected by said focus detecting unit on a basis of deviation between an image formation plane of the photographing light beam imaged by said imaging means and the predetermined primary image formation plane, said deviation being caused by an aberration of said photographing optical system.

14. A camera according to claim 13, further comprising a photometry unit for measuring object luminance, wherein said controller calculates an aperture F number during photographing on the basis of an output from said photometry unit and corrects the defocus amount on the basis of the calculation result.

15. A camera according to claim 14, further comprising a memory for storing data concerning the defocus amount correction corresponding to the aperture F number during photographing, wherein said controller corrects the defocus amount on the basis of the data stored in said memory.

16. A camera according to claim 13, further comprising an encoder for detecting an extension amount of a focusing lens in said photographing optical system, wherein said controller corrects the defocus amount on the basis of an output from said encoder.

17. A camera according to claim 16, further comprising a memory for storing data concerning the defocus amount correction corresponding to the extension amount of said focusing lens, wherein said controller corrects the defocus amount on the basis of the data stored in said memory.

18. A camera according to claim 13, further comprising a photometry unit for measuring luminances of a visible light component and infrared light component of an object, wherein said controller calculates a ratio of the infrared light component to the visible light component of the object on the basis of an output from said photometry unit and corrects the defocus amount on the basis of the calculation result.

19. A camera according to claim 18, further comprising a memory for storing data concerning the defocus amount correction corresponding to the luminance ratio of the infrared light component to the visible light component of the object, wherein said controller corrects the defocus amount on the basis of the data stored in said memory.

20. A camera according to claim 13, wherein said photographing optical system further comprises a variable-focal-length zoom mechanism and an encoder for detecting zoom position information of said zoom mechanism, and said controller corrects the defocus amount on the basis of an output from said encoder.

21. A camera according to claim 20, further comprising a memory for storing data concerning the defocus amount correction corresponding to the zoom position information, wherein said controller corrects the defocus amount on the basis of the data stored in said memory.

22. A camera comprising:

optical path splitting means for splitting a portion of a light beam from a substantially central portion of a photographing optical system;

focus detecting means for detecting a focusing state on the basis of the light beam split by said optical path splitting means; and correcting means for correcting an output from said focus detecting means under predetermined correction conditions of correcting defocusing caused by a difference between an aberration of said photographing optical system and an aberration of an optical system included in said photographing optical system.

23. A lens shutter camera comprising:

a lens shutter positioned in a substantially central portion of a photographing optical system;

optical path splitting means for splitting a portion of a light beam passing through an optical system in front of said lens shutter;

focus detecting means for detecting a focal length on the basis of the light beam split by said optical path splitting means; and correcting means for correcting an output from said focus detecting means under predetermined correction conditions of correcting defocusing caused by a difference between an aberration of said photographing optical system and an aberration of an optical system included in said photographing optical system.

24. A camera according to claim 23, wherein said focus detecting means receives the light beam split by said optical path splitting means and detects a defocus amount of an image formation plane of the light beam with respect to a predetermined primary image formation plane.

25. A camera according to claim 23, wherein said correcting means corrects the defocus amount on the basis of deviation between an image formation plane of the photographing light beam imaged by a film and the predetermined primary image formation plane.

* * * * *